United States Patent [19]

Busnel et al.

[11] 3,997,020
[45] Dec. 14, 1976

[54] SOUND ABSORBER

[76] Inventors: René-Guy Busnel, Vauboyen, 91 Bievre, France; Hellmuth Etzold, 105A Central St., Narragansett, R.I. 02882

[22] Filed: Oct. 29, 1974

[21] Appl. No.: 519,003

[52] U.S. Cl. .............................................. 181/33 G
[51] Int. Cl.² ........................................ E04B 1/99
[58] Field of Search ............... 181/33 G, 33 R, 166, 181/198, 199; 52/145

[56] References Cited

UNITED STATES PATENTS

| | | | |
|---|---|---|---|
| 2,062,478 | 12/1936 | Riesz | 181/33 G UX |
| 2,293,181 | 8/1942 | Terman | 181/33 G UX |
| 2,710,335 | 6/1955 | Wong | 181/33 G UX |
| 2,783,008 | 2/1957 | Bodine | 181/33 G UX |
| 3,506,089 | 4/1970 | Junger | 181/33 G UX |
| 3,814,208 | 6/1974 | Morresi et al. | 181/33 G |

*Primary Examiner*—John Gonzales
*Attorney, Agent, or Firm*—Karl F. Ross; Herbert Dubno

[57] ABSTRACT

A sound absorber comprises an acoustical horn whose mouth is turned towards a source of sound the radiation of which is to be deadened or absorbed and at its narrow throat is provided with a small plug sound-absorbing material of selected acoustical impedance. Such a unit can be made of hard construction material such as plaster or concrete, wood or metal and fiberglass or rock wool of predetermined density may be employed as the sound absorber at the narrow throat of the horn. The horn is preferably of exponential shape. Two absorbers of this kind facing each other can be used as building block of a double shell sound attenuating wall, with high sound transmission loss (STL).

6 Claims, 23 Drawing Figures

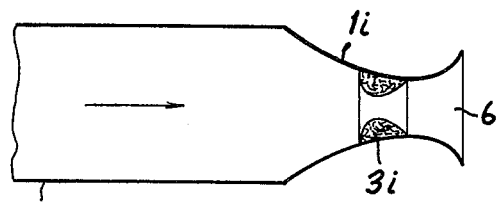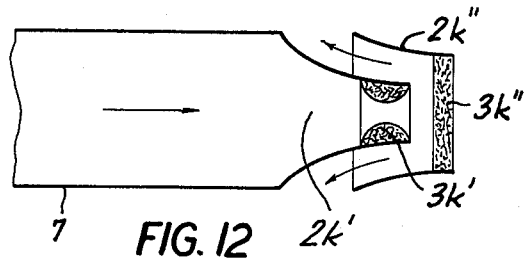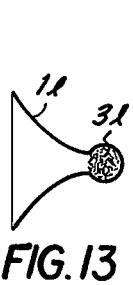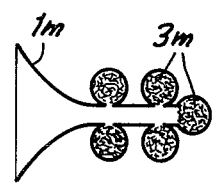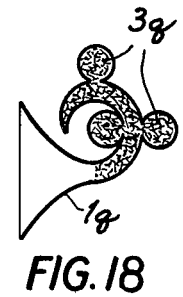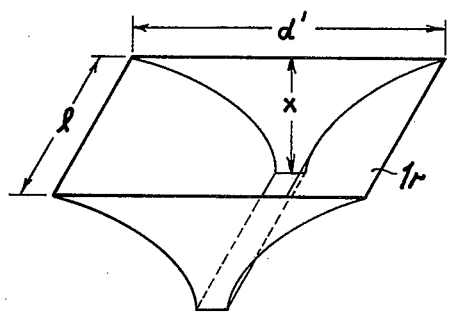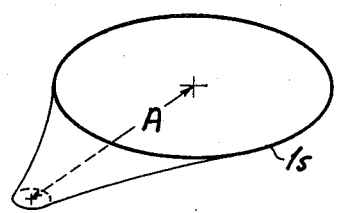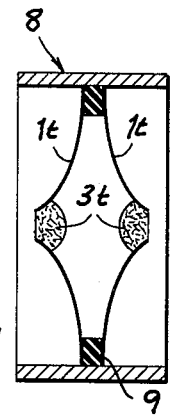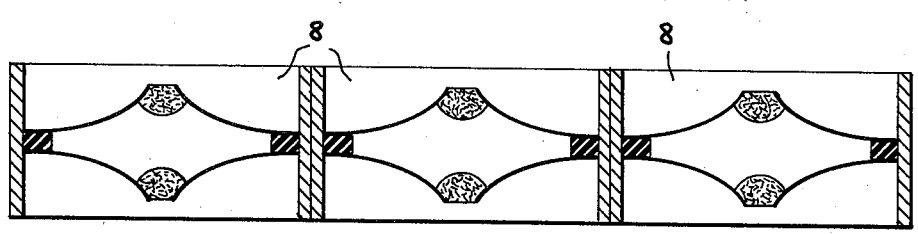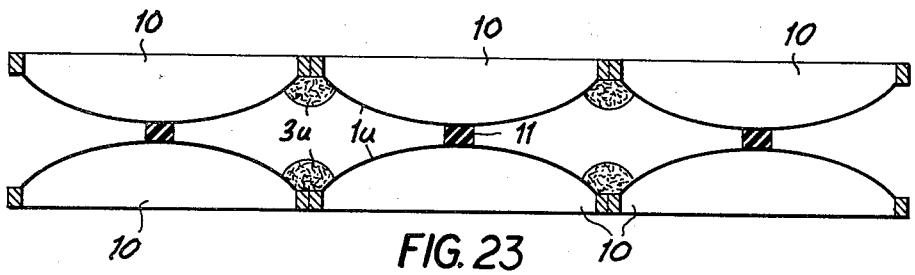

SOUND ABSORBER

FIELD OF THE INVENTION

The present invention relates to a type of sound absorbing structure. More particularly this invention concerns a sound absorber integrated in a construction element.

BACKGROUND OF THE INVENTION

In order to reduce the sound level in a space it is frequently necessary to provide in this space or adjacent thereto a sound-absorbing medium. Thus in the simplest arrangement a room is fitted with drapes along one wall which tend to absorb and dissipate sound rather than to reflect it. It is also known to form the walls and ceilings of such high-noise areas as highway or underground subway stations in such a manner that they do not directly reflect sound back into the space surrounding the source. Thus the walls are formed with an array of coffers or the like to deaden sound to a limited degree.

Such arrangements have a relatively limited capacity to absorb sound. In addition they frequently require considerable maintenance, especially in the soft type of sound absorber using textile hangings, acoustic tile, and the like.

OBJECTS OF THE INVENTION

It is therefore an object of the present invention to provide an improved sound absorber.

Another object of this invention is the provision of a building element including such a sound absorber.

A further object is the provision of a sound absorber which requires little or no maintenance and which can be produced relatively inexpensively, because of the small amount of sound absorbing material needed.

Yet another object is to provide such an absorber which works with a high degree of efficiency, that is, which absorbs a great deal of the sound that impinges on it.

Still another object of the invention is to provide an improved sound attenuating wall of reduced sound tranmissivity and increased sound transmission loss (STL), e.g. to blank regions of high noise level.

SUMMARY OF THE INVENTION

These objects are attained according to the present invention in a sound absorber comprising an acoustical impedance transformer open outwardly and provided at a small cross-section portion with a plug of absorbing material. This transformer comprises in accordance with the present invention, a preferably exponential horn having a wide end turned toward the source of sound to be absorbed or deadened and a narrow end at which is provided the absorbing material.

According to yet another feature of this invention the exponential horn is described by the formula $S = S_o e^{mx}$, where $S$ is the cross-sectional area of the wide end of said horn, $S_o$ is the cross-sectional area of the narrow end or throat of the horn at which the absorbing material is arranged, $x$ is the length of the horn between the two ends, and $m$ is the flaring constant of the horn which determines the growth function of the cross section thereof. The flaring constant $m$ is preferably about 0.4 to 1.5 cm$^{-1}$ where $x$ is measured in cm.

Thus in accordance with the present invention, the sound is funneled by the acoustic transformer into a sound-absorbing material where its sound energy is dissipated. The ratio of the acoustical impedance at the mouth and at the throat of the horn determines the principal characteristic of the acoustical transformer formed by this horn, and therefore the sound-trapping and sound-absorbing capacity of the unit.

According to yet another feature of this invention such an absorber is built into a tile-like structure. It is possible to secure an array of such tiles into a wall in, for instance, a tunnel so as to reduce the noise level therein.

The horn according to the present invention can be formed with a circular or elliptical mouth and throat which may be parallel to and in line with each other so that the horn body therebetween forms a body of revolution such as on an axis perpendicular to the planes of the mouth and throat, or this axis can be inclined relative to these planes. It is also possible for the mouth and the throat to be nonparallel to each other. The horn according to the present invention may be formed of an exponential cylinder, and have a square mouth and throat.

We recognize that sound absorber structures using the principle of perforated or apertured surfaces have been proposed and used heretofore and that acoustical horns are more or less commonplace in the acoustic field, albeit for entirely different and indeed opposite purposes. Our discovery, however, is not that the perforated surface is capable of trapping sound nor it is simply the discovery that a horn configuration will concentrate sound, but rather it is the discovery that an absorber plug located at the constricted portion of a horn having a continuously decreasing cross-section in accordance with the exponential characteristic given above, appears to become more effective in a manner similar to the way in which thermal dissipation of electrical energy can be increased by increasing the current through a resistive element, i.e. the horn impedance matches the acoustic impedance of the absorbing material.

This is indeed surprising since considerable work in the sound-absorbing field has been based upon the belief that best sound dissipation is accomplished when the sound is caused to pass through a diverging passage in the direction of divergence and/or through a passage lined with sound-absorbtive material. The present system eliminates the need for lining the sound duct or passage with such material.

We have repeatedly referred to an "absorber" herein a above and will refer to the same in the claims with the understanding that the term is used not solely as an acoustic energy eliminator in a space, but also to refer to sound attenuation in a wall, partition or other acoustic barrier. A sound attenuator may be a wall flanking a region of high noise level and having a low sound transmissivity. According to the present invention a sound attenuator can be provided with sound absorbers of the type previously described.

More specifically, a sound attenuator, according to the present invention consists of a wall or other structure having a pair of oppositely facing, confronting arrays of sound absorbers each of which has a horn and a plug of sound-absorbing material at a narrow end of the horn. The horns of the two arrays flare toward on another.

One of the major advantages of such a sound attenuator, apart from its high efficiency, is that the volume of sound-absorbing material at the narrow end of each horn can be relatively small so that the total quantity of sound-absorbing material associated with each array may be far less than the amount of sound-absorber material required to cover the area over which the array is effected.

BRIEF DESCRIPTION OF THE DRAWING

The above and other objects, features, and advantages of the invention will become more readily apparent from the following description, reference being made to the accompanying drawing in which:

FIGS. 11 and 12 are side schematic views of absorbers usable as mufflers;

FIGS. 13 – 18 are side schematic views of further absorbers in accordance with the present invention;

FIGS. 19 and 20 are perspective diagrammatic views of horns according to the present invention;

FIG. 21 is a section through a sound-attenuating construction element according to this invention; and FIGS. 22 and 23 are sections through sound attenuating walls embodying the sound absorber of the present invention.

SPECIFIC DESCRIPTION

Figure 1:
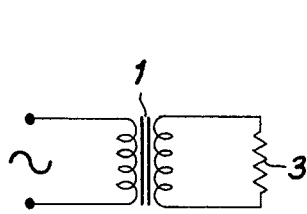
FIG 1 is an electrical schematic diagram illustrating principles of operation of the absorber according to the present invention.

FIG. 1 shows by way of analogy to an electrical circuit how a system according to the present invention functions. A transformer 1 receives electrical energy of a predetermined voltage level and converts it into electrical energy of another voltage level. This converted energy is fed to a resistor 3 which dissipates the electrical energy in the form of heat. Thus, for example, electrical energy at 1000 V and 1 Amp is fed to the transformer, converted to 100 V and 10 Amps, neglecting losses, and fed to the resistor 3 where it is converted into heat ($I^2R$ or $E^2/R$). Thus this system could be termed an electrical-energy absorber, in comparison to the sound absorber of the present invention. Note that the transformer 1 increases the value I upon which the heat dissipation $I^2R$ depends. Our acoustic impedance matching thus corresponds to that applied in electrical engineering principles.

Figure 2:
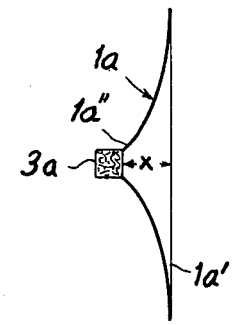
FIGS. 2 – 4 are diagrammatic side views of exponential horns in accordance with the present invention.
Figure 3:
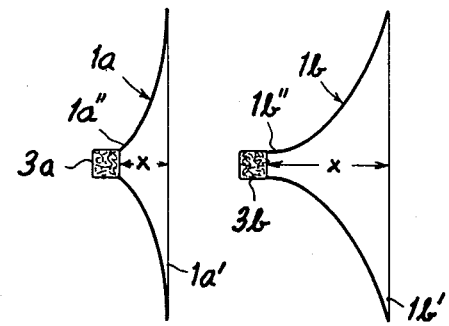
Figure 4:
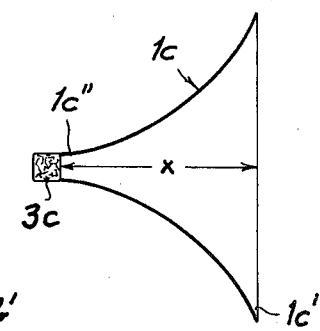

FIGS. 2, 3 and 4 illustrate the acoustic absorber according to the present invention. Here transformers $1a$, $1b$ and $1c$ are each provided with a respective body of sound-absorbing material $3a$, $3b$ and $3c$ so that sound energy entering at the mouths $1a'$, $1b'$ and $1c'$ is transformed and funneled to the respective plug of absorbing material at throat $1a''$, $1b''$ and $1c''$ of the absorber. The absorbent material at the throat serves to convert the sound energy measured in watts/in$^2$ whose intensity (equivalent to electric power density), into heat energy.

The horns shown in FIGS. 2 – 4 are formed according to the formula $S = S_o e^{mx}$ wherein S is the cross section of the ends $1a'$, $1b'$, $1c'$ which is proportional to the square of the diameter of the ends, $S_o$ is the cross-sectional area of the throats $1a''$, $1b''$, $1c''$ of the horns, $x$ is the overall length of the horn, and $m$ is the flaring constant. This flaring constant $m$ is different in each of the horns of FIGS. 2 – 4.

While we have discussed repeatedly herein the exponential character of the horns according to the invention and we prefer to operate with horns corresponding to the exponential formula given above wherein $m$ ranges between substantially 0.4 to 1.5 cm$^{-1}$. It should be noted that "substantially exponential" horns can also be used in particular cases or with less effectiveness as may be required from time to time. The growth function of the horn may be linear (although this is not the preferred case as noted) but is most advantageously nonlinear. Typical nonlinear growth functions other than the exponential growth function as defined, are conical, catenoidal, parabolic and hyperbolic functions.

Figure 5:
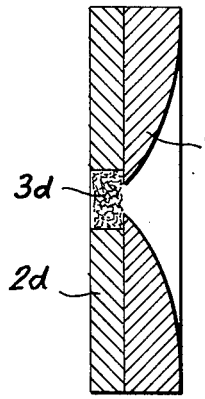
FIGS. 5 and 6 are sections through two absorbers according to the present invention.

The absorber shown in FIG. 5 has a horn structure $1d$ formed of plaster and overlying a block $2d$ in which is formed a cavity receiving the plug $3d$ of absorbent material, here compressed rock wool. In one practical embodiment of this structure the structure $1d$ is of square or prismatic shape and 1 ft on a side. When bonded adhesively to the block $2d$ the overall thickness of the absorber is 2 in with the horn opening from a central diameter of 2-¼ in to the full 1-ft diameter at the mouth so that the flaring constant $m$ is 0.7. The plates $1d$ and $2d$ are made of plaster, and rock wool having a density of 0.2 g/cm$^3$ is used as absorber. The absorption of impinging sound was equal to 38% when tested in a reverberation chamber for the audible range of frequencies.

Experiments with the sound-attenuating wall were measured with a test area of 1.35 m$^2$ in a reverberation chamber and the absorption coefficient was found to be 37.5% with a total wall thickness of 5 cm.

Figure 6:
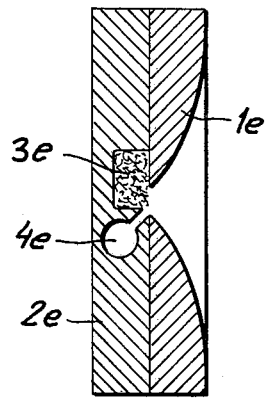

FIG. 6 shows an arrangement similar to FIG. 5 but wherein the backing plate $2e$ behind the horn plate $1e$ in addition to holding the absorbent material $3e$ is also formed with a small resonating chamber $4e$ open at the throat of the horn $1e$ and serving as a reactive element in the absorber, thus permitting frequency dependant sound absorption.

The horn can be made of plaster as shown, ceramic material, glass, synthetic-resin material, metal, concrete or the like. It is possible to use for absorbing material rock wool, as disclosed, fiberglass, porous ceramic material, porous sintered metal, or even a layered material of nonuniform acoustical properties.

Figure 7:
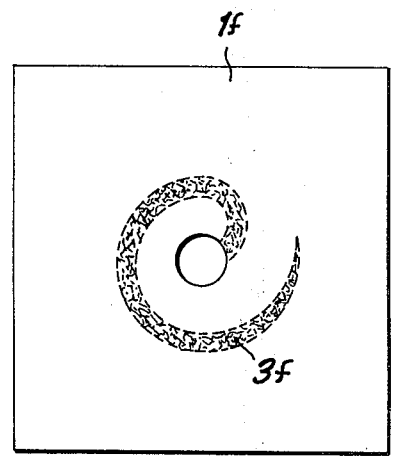
FIGS. 7 and 8 are front views of absorbers according to the present invention.
Figure 8:
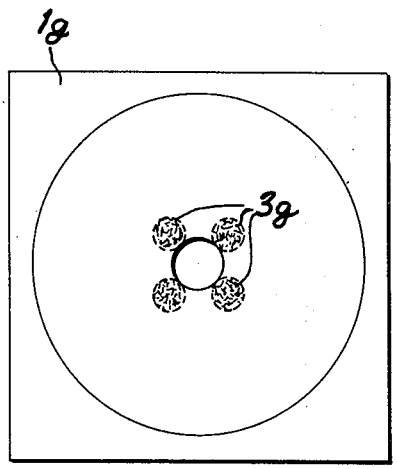

The arrangement shown in FIG. 7 has a horn structure $1f$ which is provided with an arrangement $3f$ of absorbent material that extends in a spriral away from the throat of the horn. The arrangement shown in FIG. 8 is substantially identical except that here the horn $1g$ is provided adjacent its throat with a plurality of small cavities filled with absorbent material surrounding the throat of this horn.

Figure 9:
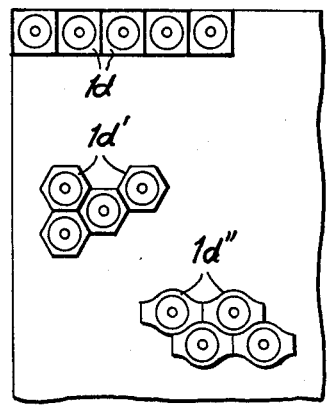
FIG. 9 shows a wall structure in accordance with this invention.

The wall structure shown in FIG. 9 is provided at its upper corner with a plurality of square (prismatic) construction elements formed as shown in FIG. 5. There is also shown in this FIGURE how hexagonal-section construction elements $1d'$ or tile-shaped construction elements $1d''$ can also be used. In all cases these separate elements interfit so that the wall in question can be covered with such sound-absorbing tiles. Such a structure is particularly advantageous in a highway or railway tunnel so as to lower the noise level therein, or in a shielding wall on the side of highways to absorb a considerable part of the traffic noise.

Figure 10:
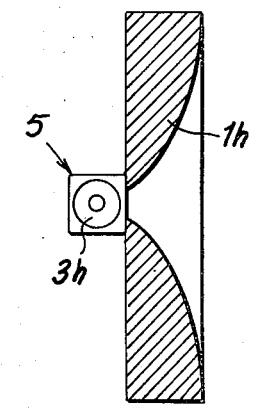
FIG. 10 is an axial section through yet another absorber according to this invention.

The arrangement shown in FIG. 10 has a horn $1h$ which is provided at its rear with a body 5 of cubical shape each of whose faces $3h$ has a different sound-absorbing characteristic. This body is fitted to the back of the tile $1h$ by the installer who is able therefore to adjust the sound-absorbing capacity of the system on the spot as the tiles are mounted. Thus, it is possible to deliver a single cover tile with a single six-sided (prismatic) block of absorbent material that is fitted to the back of the tile and allows six different sound-absorbing characteristics to be obtained.

As shown in FIG. 11 it is also possible to form a muffler according to the present invention by providing a horn $1i$ which is provided with an annular body $3i$ at its throat but which opens downstream of this throat in a further mouth 6. The upstream end of the horn $1i$ is connected to an inlet conduit 7 coming from the exhaust system. The arrangement shown in FIG. 12 has a similar inlet conduit but the horn $2k$ here is provided with a layer of absorbent material $3k''$ at its throat. Another horn $2k''$ having the same direction of flare as the horn $2k'$ is fitted over the throat of the horn $2k'$ so that whatever sound exits directly from the horn $2k'$ will be absorbed by the horn $2k''$.

The arrangement shown in FIGS. 13 - 18 all show respective exponential horns $1l - 1q$. The horn $1l$ is fitted with a round mass of absorbent material $3l$ whereas the horn $1m$ has a plurality of such masses $3m$ at the throat of the horn. In FIG. 15 the mass $3n$ is provided in the backwardly fared end of the horn $1n$ whereas in FIG. 16 a semispherical body $3o$ is employed. The horn, $1p$ of FIG. 17 continues backwardly in a spiral filled with sound absorbing material $3p$ while in FIG. 18 the spiral is also provided with lateral lobes $3q$ filled with sound-absorbing material.

FIG. 19 illustrates how the exponential structure can also be based on a cylinder having a width $d$ and a length $l$. The formula for such a cylinder would therefore be $dl = d_o l e^{mx}$ wherein $d_o$ is the width of the horn for any given distance $x$ from the throat thereof.

The arrangement of FIG. 20 has a horn $1s$ whose mouth and throat are in parallel planes and both are of similar elliptical shape, and are offset to each other so that the central axis A of the horn is at an angle to the planes of the mouth and throat of the horn $1s$.

FIG. 21 shows a building block 8 on which are provided a pair of exponential horns $1t$ facing each other and each provided with respective bodies $3t$ of sound-absorbing material. The mouths of these horns are held apart by elastic spacer blocks 9 of high internal friction loss so that the building block can be mounted in a wall and will serve to form a wall providing very high sound *transmission loss* values.

Such an arrangement is shown in FIG. 22 wherein three such blocks 8 are shown.

The arrangement shown in FIG. 23 is essentially similar except that here blocks 10 are used having convex surfaces turned towards each other and held apart by a small spacer block 11. The convexity of these blocks 10 is such that each pair of blocks forms a respective horn $1u$ and a body of absorbent material $3u$ is fitted into the base of each of the horns $1u$ so formed so as to function substantially as described above.

The sound absorbers and sound attenuating walls according to the present invention are extremely effective in absorbing or shielding sound and can be produced relatively inexpensively. In addition it has very low maintenance as it is possible to make such a unit of a very hard material. Thus it is possible to line the walls of an area such as a subway station with such tiles and greatly decrease the noise level without substantially increasing the maintenance problems of such an area.

I claim:
1. A sound absorber comprising:
   a block of rigid sound-reflecting material formed with a recess having walls defining a horn acting as acoustical impedance transformer and having a relatively wide mouth and a relatively narrow throat, the width of said mouth exceeding the distance between said mouth and said throat; and
   a plug of sound-absorbing material of matched acoustical impedance at said throat.
2. A sound absorber comprising:
   a body of rigid sound-reflecting material forming an array of horns acting as acoustical impedance transformers and each having a relatively wide mouth and a relatively narrow throat; and
   a plug of sound-absorbing material at each said throat, each said horn being an exponential horn having a surface extending between said throat and said mouth defined by the exponential formula $s = s_o e^{mx}$ wherein S is the cross-sectional area of an exponential horn at said mouth, $S_o$ is the cross-sectional area of said horn at said throat, $x$ is the straight-line distance between said mouth and said throat, and $m$ is the flaring constant of said horn and ranges between 0.4 and 1.5 cm$^{-1}$.
3. The absorber defined in claim 2 wherein said horn is closed at said throat by said plug.
4. The absorber defined in claim 2 wherein said body is of generally prismatic shape and is adapted for use as a building block.
5. The absorber defined in claim 4 wherein said block is formed with a pair of such horns facing in opposite directions, thereby forming a sound attenuating wall.
6. A sound attenuating wall comprising a pair of oppositely facing confronting planar arrays of horns each flaring in the direction of the other array, and respective plugs of sound-absorptive material at the narrow end of each of said horns.

* * * * *